March 18, 1924.                                                  1,487,280
C. SKAARNÄS
APPARATUS FOR REGULATING THE ADMISSION AND DISCHARGE IN WATER
TANKS AND OTHER RECEPTACLES
Filed Nov. 2, 1922
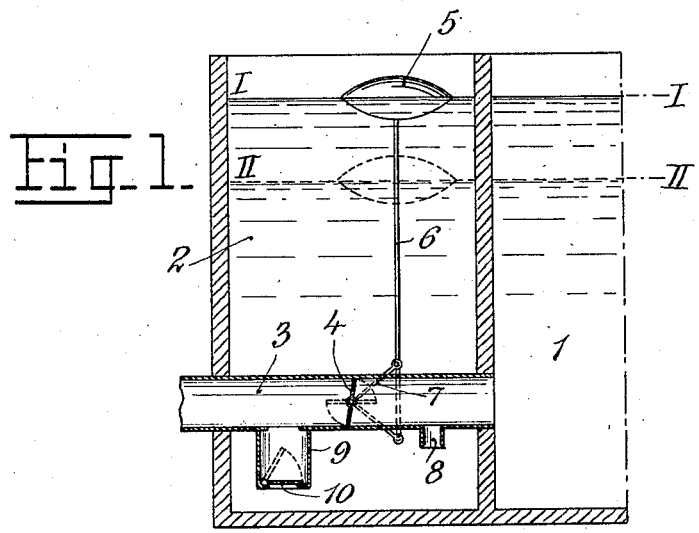
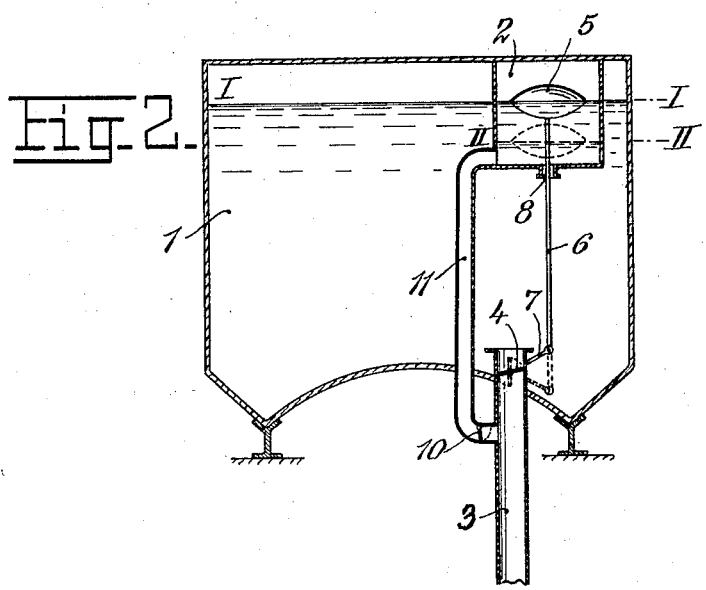
Inventor -
Christian Skaarnäs,
By- B. Singer. Atty Patented Mar. 18, 1924.

1,487,280

UNITED STATES PATENT OFFICE.

CHRISTIAN SKAARNÄS, OF DRAMMEN, NORWAY, ASSIGNOR TO AKTIESELSKABET DRAMMENS ARMATURFABRIK, OF DRAMMEN, NORWAY.

APPARATUS FOR REGULATING THE ADMISSION AND DISCHARGE IN WATER TANKS AND OTHER RECEPTACLES.

Application filed November 2, 1922. Serial No. 598,675.

*To all whom it may concern:*

Be it known that I, CHRISTIAN SKAARNÄS, a subject of the King of Norway, residing at Kirkegaten 4, Drammen, Norway, have invented new and useful Improvements in Apparatus for Regulating the Admission and Discharge in Water Tanks and Other Receptacles, of which the following is a specification.

The object of the invention is an apparatus for regulating the admission and discharge in water tanks and other receptacles and the peculiar feature of the invention consists in an arrangement for the automatic opening of the admission valve when the pressure in the admission pipe falls below the pressure in the tank or reservoir.

The invention is illustrated in the accompanying drawing.

Fig. 1 represents in section a form of construction suited for a tank.

Fig. 2 represents another form of construction suited for example for a water-tower.

In the drawing 1 indicates the tank or the reservoir that is to be filled with water. 2 indicates a float-chamber which communicates with the tank 1 through a narrow opening 8, 3 the admission pipe, 4 a shutting off valve which is connected with the float 5 through the arm 7 and the rod 6. 9 indicates a valve casing in the junction of the pipe 3 and furnished with a large flap-valve 10 (Fig. 1). In Figure 2, 11 indicates a communication pipe between the float chamber 2 and the main-pipe 3 outside the valve 4.

The arrangement shown in Fig. 1 acts in the following manner:

When the tank 1 is empty and over-pressure prevails in the pipe 3 the water flows over the opened valve 4 into the tank 1 until the water-level desired is reached in the tank 1 at I—I when the float 5 will shut off the admission. During the filling the narrow opening 8 will effect coincidence between the water-level in the tank 1 and the chamber 2 and ensure also that after the shutting off of the admission the water-level in the float-chamber shall not rise higher than in the tank in consequence of permeability of the valve 10.

When the tank is full and there is a fall of pressure in the pipe 3 the valve 10 will open so that the water can flow back from the chamber 2 into the pipe 3.

As the flow through the valve-casing 9 is greater than the flow through the opening 8, the water level falls quicker in the chamber 2 than in the tank 1.

Now if the water level in the chamber 2 falls in this way, the float 5 opens the valve 4 so that the water can flow out of the full tank 1 through the pipe 3.

The arrangement shown in Fig. 2 acts in a similar manner. If the pressure in the pipe 3 falls below that in the reservoir 1 the valve 10 is opened and the water flows from the chamber 2 through the pipe 11 to the pipe 3 whilst it can only flow slowly through the opening 8. The result of this is that the water-level in the chamber will sink quickly and thereby bring about a complete opening of the valve 4.

The described invention is of course not confined to the details represented and may be employed for liquids other than water.

Having now particularly described and ascertained the nature of my said invention and in what manner the same is to be performed, I declare that what I claim is:

Apparatus for regulating the admission and discharge of water tanks and the like, comprising a reservoir, a supply and discharge conduit connected to the reservoir, a float chamber having restricted permanent connection with the reservoir, a control valve in the conduit, a float in the float chamber and connected to the control valve to operate the same upon a change of water level in the float chamber, a duct connecting the conduit and the float chamber, and a valve in said duct operable upon reduction of pressure in the conduit to open said duct.

In witness whereof I affix my signature.

CHRISTIAN SKAARNÄS.